United States Patent [19]

Shibuki et al.

[11] Patent Number: 4,641,065
[45] Date of Patent: Feb. 3, 1987

[54] MOVING COIL TYPE LINEAR MOTOR

[75] Inventors: Osamu Shibuki, Nagoya; Noboru Matsuyama, Handa; Yoshiaki Nagasawa, Toyota; Katsuhiro Kawai; Shigeru Sakagami, both of Nagoya; Toshiaki Onoyama, Nishio, all of Japan

[73] Assignee: Toyota Shatai Kabushiki Kaisha, Kariya, Japan

[21] Appl. No.: 733,775

[22] Filed: May 14, 1985

[30] Foreign Application Priority Data

| May 16, 1984 | [JP] | Japan | 59-71491[U] |
| Sep. 11, 1984 | [JP] | Japan | 59-137508[U] |
| Sep. 19, 1984 | [JP] | Japan | 59-141734[U] |
| Sep. 21, 1984 | [JP] | Japan | 59-144056[U] |
| Dec. 3, 1984 | [JP] | Japan | 59-183839[U] |
| Dec. 10, 1984 | [JP] | Japan | 59-186955[U] |

[51] Int. Cl.⁴ .................................. H02K 41/00
[52] U.S. Cl. ..................... 318/135; 310/13; 310/27
[58] Field of Search .................. 310/12–14, 310/27; 318/135

[56] References Cited

U.S. PATENT DOCUMENTS

| 3,452,259 | 6/1969 | Shtrikmau et al. | 310/27 X |
| 3,619,673 | 11/1971 | Helms | 310/13 |
| 3,917,987 | 11/1975 | Inoue | 318/135 |
| 4,151,447 | 4/1979 | von der Heide | 310/12 X |
| 4,260,914 | 4/1981 | Hertrich | 310/27 |
| 4,318,038 | 3/1982 | Munehiro | 318/135 |
| 4,369,383 | 1/1983 | Langley | 310/12 |
| 4,529,906 | 7/1985 | McMahon | 310/13 |
| 4,560,911 | 12/1985 | Chitayat | 310/12 X |

FOREIGN PATENT DOCUMENTS 55-83454 6/1980 Japan .
57-113767 7/1982 Japan .

Primary Examiner—Donovan F. Duggan
Attorney, Agent, or Firm—Burns, Doane, Swecker & Mathis

[57] ABSTRACT

A moving coil type linear motor comprises a rail of generally U-shaped cross section, permanent magnets of flat plate-shape and magnetized in the direction of thickness and provided on an inner side of the rails with varied polarities of magnetic poles next to each other. A pair of coils whose length is 1.5 times that of the magnetic pole and has a space of 0.5 times the length of the magnetic pole in the center thereof, are disposed opposingly with the permanent magnets and travel along the permanent magnets within the rail. Brushes are provided with the respective coils, and a feeder pattern arranged on an inner side of the rail, feeds electric power to the coils through the brushes, only when respective active coil parts of the coils are fully in the magnetic flux of the same direction. The linear motor also comprises sensing means for detecting signals regarding the traveling of the coils, and controlling means for controlling the travel of the coils on the ground of the signals from the sensing means.

11 Claims, 46 Drawing Figures

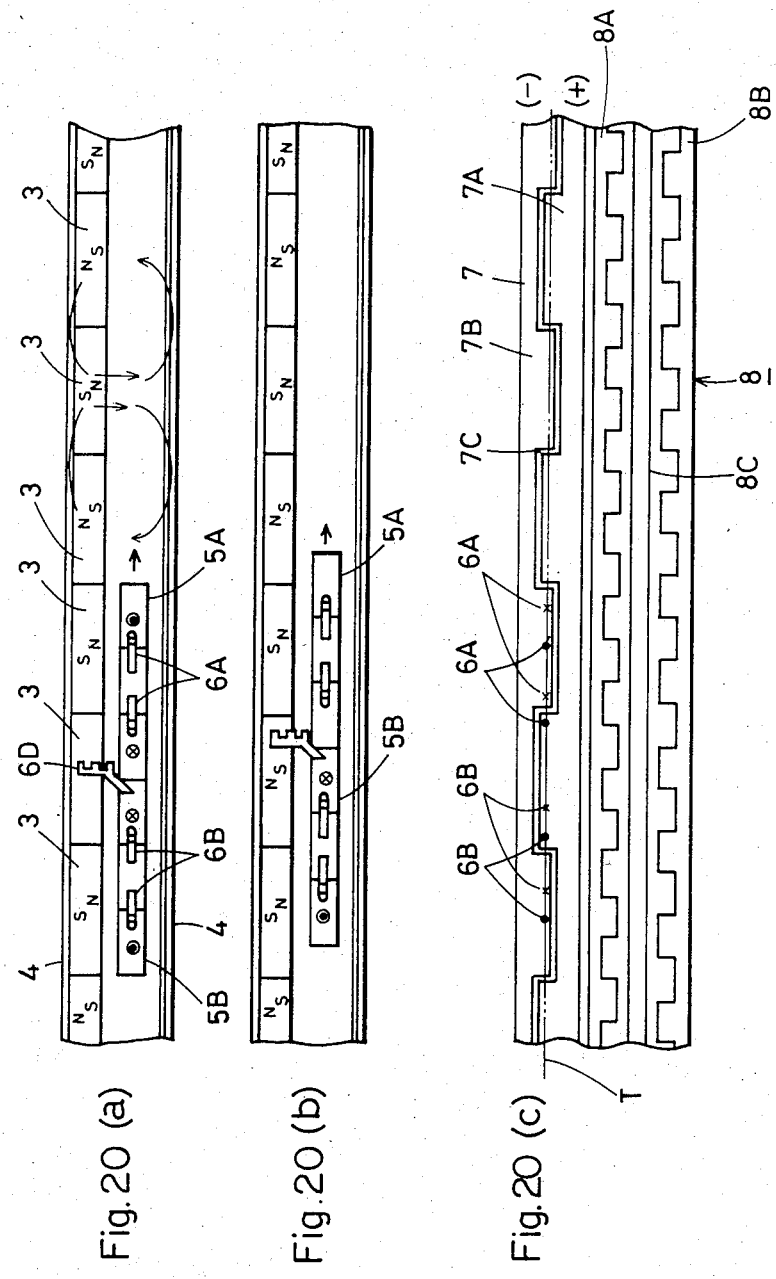

Fig. 26 (a)  Fig. 26 (b)
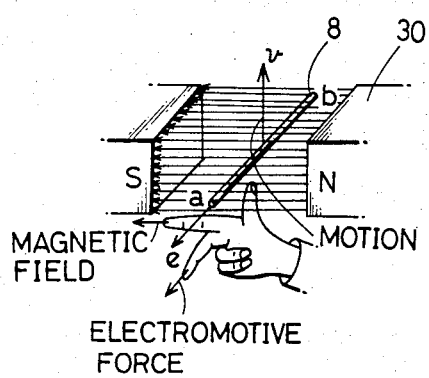
RIGHT HAND RULE
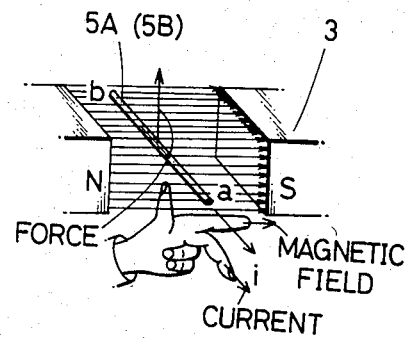
LEFT HAND RULE
Fig. 27
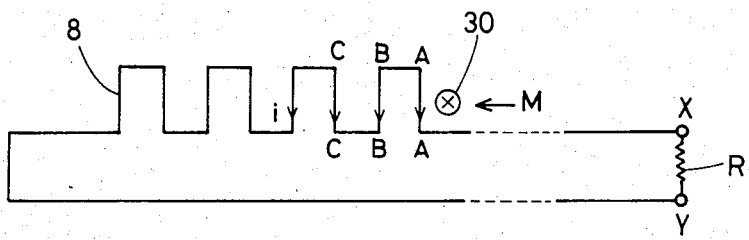
Fig. 28
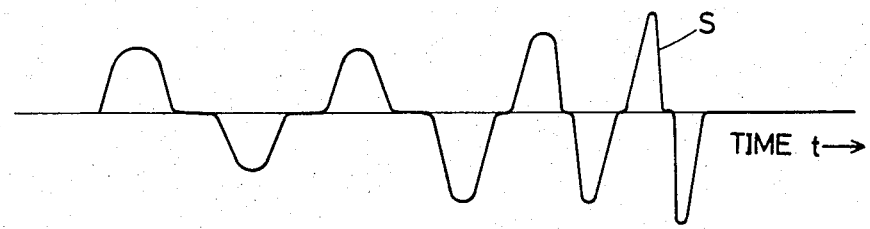

Fig.30(d) WAVE FORM OF CURRENT TO COIL 5A
Fig.30(e) WAVE FORM OF CURRENT TO COIL 5B
Fig.30(f) WAVE FORM OF CURRENT TO MOTOR

MOVING COIL TYPE LINEAR MOTOR

BACKGROUND OF THE INVENTION

The present invention relates to a moving coil type linear motor which is used to move equipment such as the bodies of auto-mobiles, and is also usable for optional usages.

DESCRIPTION OF THE PRIOR ART

Conventionally, a moving coil type linear motor is provided with permanent magnets on both sides of a moving coil. More particularly, a well-known arrangement of a motor of this type has magnets disposed on the inner sides of two yokes, and the moving coil is fixedly engaged with a slide member slidably supported on the yokes, but there is a problem in that a cross sectional area of the motor is exceedingly large due to the two magnets disposed on both sides of the coil. A linear motor disclosed in an earlier Japanese patent open publication No. Sho 57-113767 (U.S. Ser. No. 221,607 filed in Dec. 31, 1980), arranges a moving coil on one side of a plural number of magnets supported by a hollow cylindrical bearing which is supplied with air from two parallel bearing pipes disposed on one side of the plural magnets. This linear motor needs a complicated electronic circuit and is expensive, because the motor is provided with a sensor supported by the bearing pipes for sensing the polarity of the magnetic flux of the magnets, and the electronic circuit is connected with the sensor through lead wires for switching over the direction of current flowing through the moving coils. The linear motor of this sort also is inconvenient because of the needs for handling the wires travelling with the moving coils.

SUMMARY OF THE INVENTION

Accordingly, it is an object of the present invention to provide a linear motor having an exceedingly small configuration in cross section. Another object of the invention is to provide a linear motor of which a moving coil is movably guided along consisting members of the linear motor without special members for guiding the moving coils.

Another important object of this invention is to provide a linear motor which can switch over and supply electric power to a moving coil with regard to the polarity of magnetic poles and yet without a magnetic sensor and an electronic circuit for switching over a direction of current.

A further object of the present invention is the provision of the moving coil type linear motor which can achieve a constant speed operation at a set optional speed.

It is a still further object of the invention to provide a moving coil type linear motor of which the moving coil can be stopped at a desired position.

These objects are realized by a moving coil type linear motor which comprises; a rail having an inverse U-shaped cross section, plate-like permanent magnets provided in an inner side of the rail and magnetized in the transverse direction with alternating polarities of the magnetic poles in a side by side arrangement, a pair of coils movably disposed along the permanent magnets in the rail, with each of the coils having a length 1.5 times that of the magnetic pole and having a space of 0.5 times the length of the magnetic pole in the center thereof, and electric feeding patterns arranged in the rail so as to supply electric power to the coils through brushes provided with the each of coils, only when active coil parts of the coils are disposed fully in the magnetic fluxes of the same direction.

Other and further objects of this invention will become obvious upon an understanding of the illustrative embodiments about to be described or will be indicated in the appended claims, and various advantages not reffered to herein will occur to one skilled in the art upon employment of the invention in practice.

BRIEF DESCRIPTION OF THE DRAWINGS

FIG. 27 is a circuit diagram of sense pattern to explain the operation, FIG. 28 is a wave form chart indicating the wave form of the speed signal.

DETAILED DESCRIPTION OF PREFERRED EMBODIMENT

(The First Embodiment)

Figure 1:
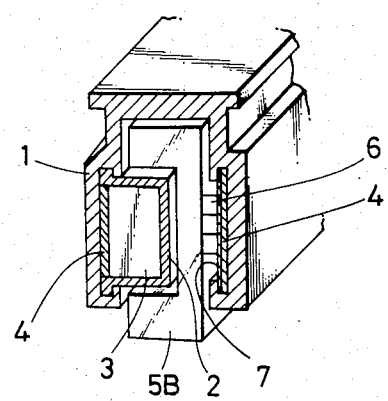
FIG. 1 is a partially cutaway view in perspective of a first embodiment of the linear motor of this invention.

In the first embodiment of the invention as disclosed in the drawings from FIG. 1 to FIG. 4, numeral 1 designates a rail of extruded bar made of a material which can not be ferromagnetic such as aluminum or synthetic resin, and the rail 1 has a generally inverse U configuration in section thereof. Numeral 2 designates a magnet holding member inserted in an inner side of a left-hand foot of the rail, and numeral 3 designates one of the permanent magnets held in the holding member 2. Numerals 4,4 designate yokes put in the both sides of the rail 1 from the end thereof and facing one another. Each magnet 3 has a configuration like a flat plate and is magnetized in a direction transverse of the plane thereof, and the plural magnets 3, . . . disposed on the yoke 4 held in the holding member 2 are arranged in order, with alternating polarities of the magnetic poles of the magnets in a side by side arrangement. Numerals 5A, 5B designate a couple of coils, which can be moved in an air-gap between the right side of the magnet holding member 2 and the left side of the right hand yoke 4, at a right angle to the fluxes of the magnets, and each coil of coils 5A and 5B is wound flatly, with active coil portions being at a right angle to the fluxes, with each active portion being half the length of the magnetic poles of magnets 3. Moreover, the coils 5A and 5B are formed like a letter U in section, the upper and lower folded parts of which make slider guides to engage with the magnet holding member 2. Each of the coils 5A and 5B has length of 1.5 times that of the magnetic pole, and has a space namely an air core part of 0.5 times the length of the magnetic pole of the magnet 3 in the center thereof. The coils 5A and 5B are respectively provided with collector brushes 6A and 6B in the spaces to minimize the thickness of the linear motor of the invention. Numeral 7 designates a feeder pattern which is disposed on the inner side of the yoke 4 within the right side foot of the rail 1. And the feeder pattern 7 is formed such that the both coil or either coils 5A, 5B will be fed with one polarity when the active coil parts of the coils or coil are fully disposed in the flux of the same direction of one of the magnets 3 . . . , and the feed polarity will be reversed when the polarity of the flux is reversed. Two dotted chain lines B,B in FIG. 4 (c) indicate the paths of brushes 6A and 6B.

Now the operation of the linear motor of the first embodiment is explained.

Figure 2:
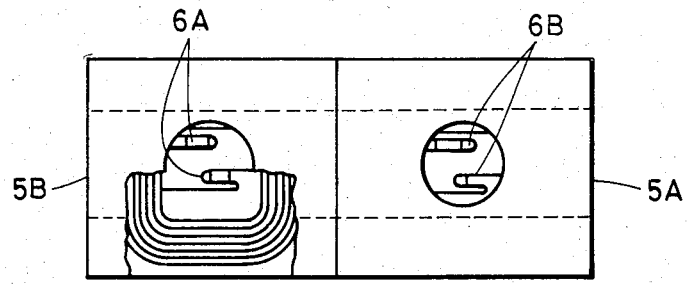
FIG. 2 is a side view of a pair of coils partially broken away.
Figure 3:
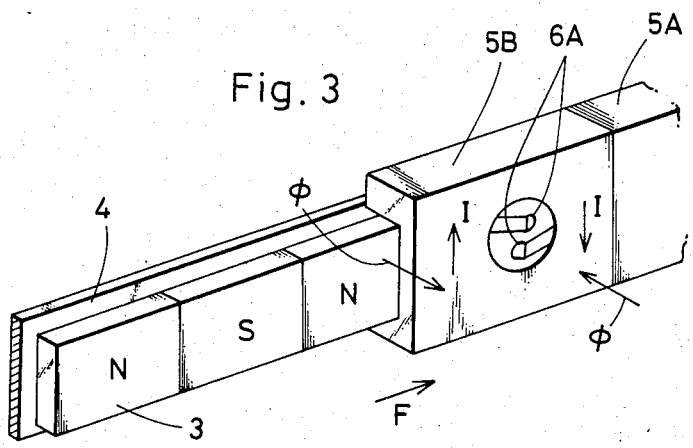
FIG. 3 is a perspective view illustrating the relative arrangement of the permanent magnets and the coils, and also shows the principles of the generation of driving force according to Fleming's left hand rule at the same time, FIG. 4 (a), (b) and (c) are sectional views illustrating the relationship between magnets and current flowing in the coils, and a side view of the electric feeding patterns in operating conditions.
Figure 4A:
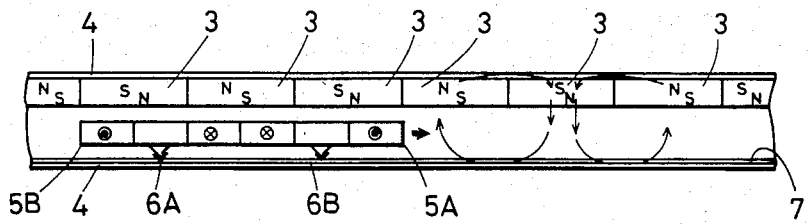
Figure 4B:
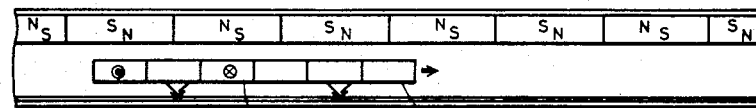
Figure 4C:
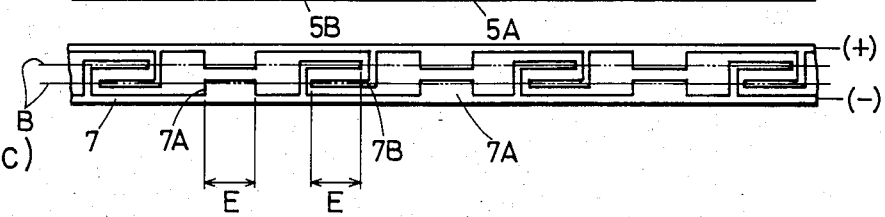
Figure 5:
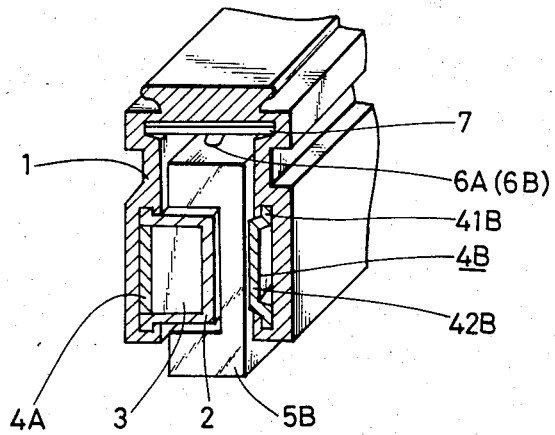
FIG. 5 is a partially cutaway view in perspective of the second embodiment of the linear motor of the invention.
Figure 6:
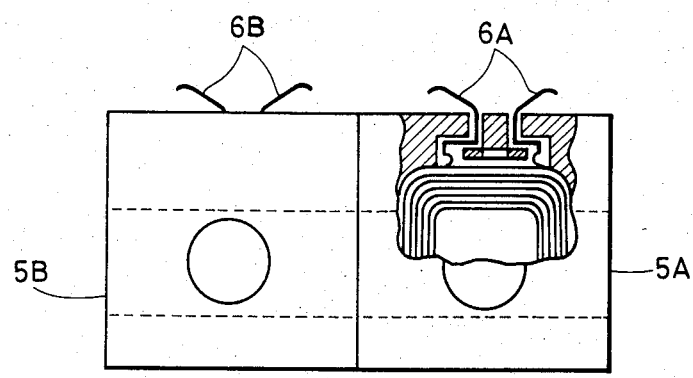
FIG. 6 is a side view of a pair of coils partially broken away.
Figure 7:
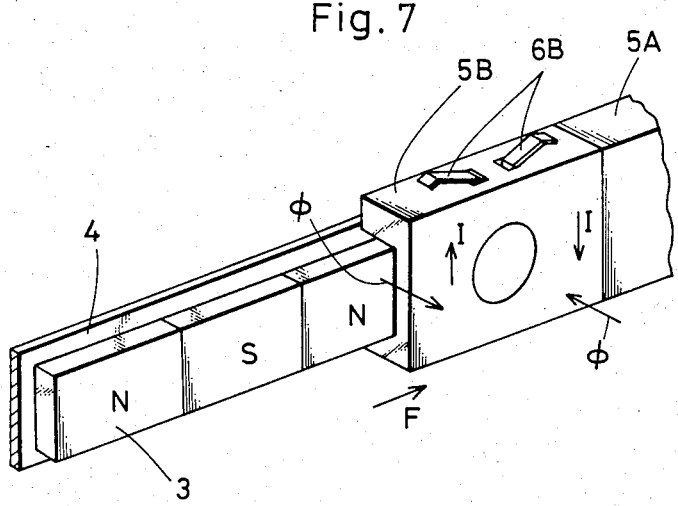
FIG. 7 is a perspective view illustrating the relative disposition of the magnets and the coils, FIG. 8 (a), (b) and (c) are sectional views showing the relationship between magnets and current in the coils, and a bottom view of the feeding patterns in the operating conditions.

Referring to FIG. 3, if the flux $\phi$ of an N-pole of one of the magnets 3 . . . comes from the surface of the figure to this side, and current I flows up in one side of the active coil parts of the coil 5B as shown, then the coil 5B moves to the right side of FIG. 3 as it is driven by the force generated for the right side according to Fleming's left hand rule. Both of the coils 5B and 5A are energized for a very short period, while the both active coil parts of the couple of coils 5B and 5A are fully in the flux of the same directions as shown in FIG. 4 (a), because the respective collector brushes 6A and 6B of the coils 5A and 5B contact with the feed sections E,E of feeder patterns 7A and 7B. The coil 5A is not energized, when the active coil parts of the coil are moving through a territory extending over a junction of magnets as shown in FIG. 4 (b), because the directions of fluxes are varying and collector brushes 6B of the coil 5A are apart from both of feeder patterns 7A and 7B. While the other coil 5B is energized, as the active coil parts of this coil are fully in the flux of the same directions, and the collector brushes 6A are in contact with the feeder pattern 7A as shown in FIG. 4 (c). Besides, in order to change direction of movement of the coil 5A and 5B, it is only necessary to reverse polarity of the power source connected with the feeder pattern 7. As shown in FIG. 2 and FIG. 3, brushes 6A and 6B are disposed in the respective center spaces of coils 5B and 5A, and the tips of the brushes 6A and 6B project from the circle windows. So, the coils 5B and 5A move as the brushes of them contact with a surface of the feeder pattern 7, and the currents I are changed over according to the direction of flux $\phi$ where the coils 5B and 5A are situated, and thus these coils are successfully fed. If the coils 5B and 5A are shifted further 0.5 times the length of the pole width of the magnet 3 to the right from the position shown in the FIG. 4 (b), collector brush 6A comes between feeder patterns 7A and 7B, on the contrary brush 6B contacts with the feeder pattern 7A, so the feeding to the coil 5B will be stopped, but the coil 5A will be fed reversely of FIG. 4 (a). In this way, a couple of the coils 5B and 5A are alternately fed, and either coil 5B or 5A is always fed.

According to the first embodiment above described, there is an advantage to be provided the linear motor having very small are in the cross section, because the collector brushes are disposed in the center spaces of the coils, and the inner shape of the motor is minimized.

(The Second Embodiment)

Referring to the drawings from FIG. 5 to FIG. 8, the second embodiment of the invention is disclosed.

As shown in the drawings, on the inner side of one foot of housing rail 1 of generally U-shaped cross section, permanent magnet 3, of which each magnet is shaped like a flat plate and magnetized in the direction of its thickness, and the magnets are arranged side by side with alternating polarities of the magnetic poles, and are held by the magnet holder member 2 which has also generally U-shaped cross section. In the rail 1, a couple of coils 5A and 5B are supported by the permanent magnet 3 through the magnet holder member 2, and these coils 5A and 5B are movably guided by the permanent magnet 3. And each of coils 5A and 5B is 1.5 times as long as the width of the magnetic pole of the magnet 3, and has a space of 0.5 times the length of the magnetic pole in the center thereof. Collector brushes 6A and 6B are respectively provided on the upper parts of coils 5A and 5B, of which coil ends are connected with the brushes. These brushes 6A, 6B are lineally arranged so the path T of them draws a streak line shown in FIG. 8 (c). Feeder pattern 7 is provided on the inner surface of the upper wall of the rail 1. Positive and negative conductors 7A and 7B of this feeder pattern 7 are alternately arranged with each other, so that the line arranged brushes 6A and 6B will be alternately contacted with the conductors, and both of the contacted parts of positive conductor 7A and negative conductor 7B are slightly shorter than a magnetic pole of permanent magnet 3, and an insulator 7C is provided between the conductors where the magnetic polarity is altered. A yoke 4A of a flat plate shape is inserted between one foot of the rail 1 and the permanent magnet 3, and a yoke 4B having a projecting portion 42B in the midway between upper and lower inserting portions 41B, is inserted in the other foot of the rail 1, whose projecting portion 42B sets up a little air gap from the coils 5A, 5B.

Figure 8:
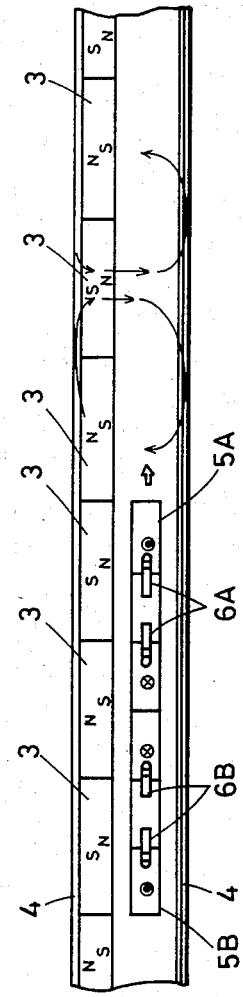
Figure 8:
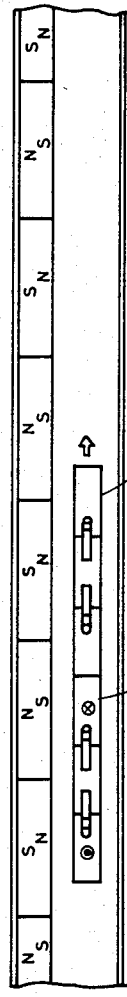
Figure 8:
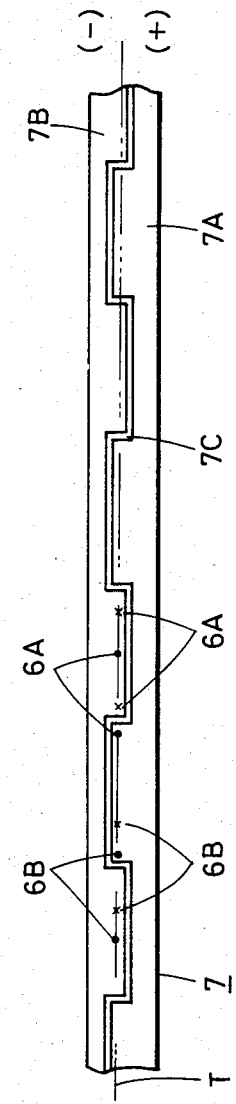
Figure 9:
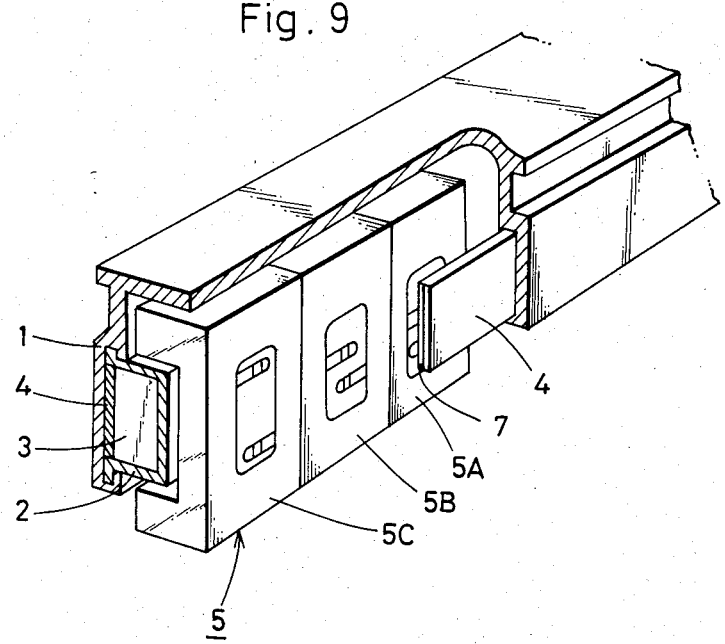
FIG. 9 is a partially broken away view in perspective of the third embodiment of the moving coil type linear motor of this invention.
Figure 10:
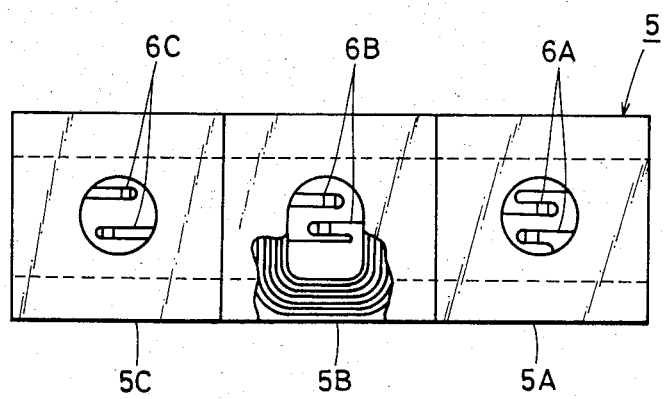
FIG. 10 is an elevation of the moving coil assembly of the motor partially broken away.

Referring now to FIG. 8, the operation of the second embodiment which has an advantage in a simplified feeder pattern, is disclosed.

As shown in FIG. 8 (a), when respective active coil parts of a couple of two coils 5A, 5B are fully in the flux of the same polarities, all tips of collector brushes 6A, 6B respectively contact with positive and negative conductors 7A, 7B of feeder pattern 7, as shown in FIG. 8 (c) with dot marks on the path T, so that a couple of coils 5A, 5B are reversely energized to generate flux at the same time, and both of the coils get propulsion to the right.

As shown in FIG. 8 (b), when respective active coil parts of coil 5B are only in the flux of the same polarity, tips of collector brush 6B contact with positive and negative conductors 7A, 7B of feeder pattern 7, as shown in FIG. 8 (c) with cross marks on the path T, so that the coil 5B is only fed and gets propulsion to the right in the figure. While respective active coil parts of coil 5A are in the flux of different polarity, both of the tips of collector brush 6A contact with negative conductor 7B, as shown in FIG. 8 (c) with the right side cross marks on the path T, so that the coil 5A is shorted by the conductor 7B and are not fed electric power.

As a couple of coils 5A and 5B are fed at the same time or alternately, they will travel in the same direction. In order to reverse direction, it is possible to reverse a polarity of a power source to be connected with the positive and negative conductors 7A, 7B of feeder pattern 7.

By the second embodiment above described, many advantages are provided, that is, propulsion force of the linear motor is more strengthened because of less air gap between coils 5A, 5B and yokes 4A, 4B, and resistance of the positive and negative conductors 7A, 7B of feeder pattern 7 is more reduced as the form of these conductors are more simplified and the width of the conductors are broadened.

(The Third Embodiment)

The third embodiment of moving coil type linear motor of the invention which is speed controllable is explained with the drawings from FIG. 9 to FIG. 16.

The moving coil type linear motor of the embodiment comprises, a rail 1 of generally reverse U-shaped cross section, flat plate permanent magnet 3 magnetized in the direction of its thickness which is held on the inner surface of one foot of the rail 1 by magnet holder member 2, and arranged in the holder member side by side with alternating polarity of the magnetic poles, yokes 4,4 disposed between the back surface of the permanent magnet 3 and the foot of the rail 1, and on the inner surface of the other foot of the rail 1, moving coil assembly 5, and stringing (or feeder pattern) 7. A couple of driver coils 5A, 5B of the coil assembly 5 are movably guided by the permanent magnet 3, and each of the driver coils 5A, 5B is 1.5 times as long as the magnetic pole and has a space of 0.5 times the length of the magnetic pole in the center thereof. And the stringing 7 which is disposed in the rail 1 will feed electric power to the coils 5A, 5B through driving feeder brushes 6A, 6B provided with the coils. Though these constructions are almost the same with the first embodiment, in this third embodiment, speed detector coil 5C which is 1.5 times as long as the magnetic pole is comprised in the moving coil assembly 5 in addition to the couple of coils 5A, 5B, and that speed signal collector pattern 7D is disposed on the upper and lower side of the driver feeder patterns 7A, 7B. Moreover, speed signal sender brushes 6C are provided with the speed detector coil 5C, and an upper and lower interval of the brushes 6C is larger than the intervals of the driver feeder brushes 6A, 6B.

Figure 13:
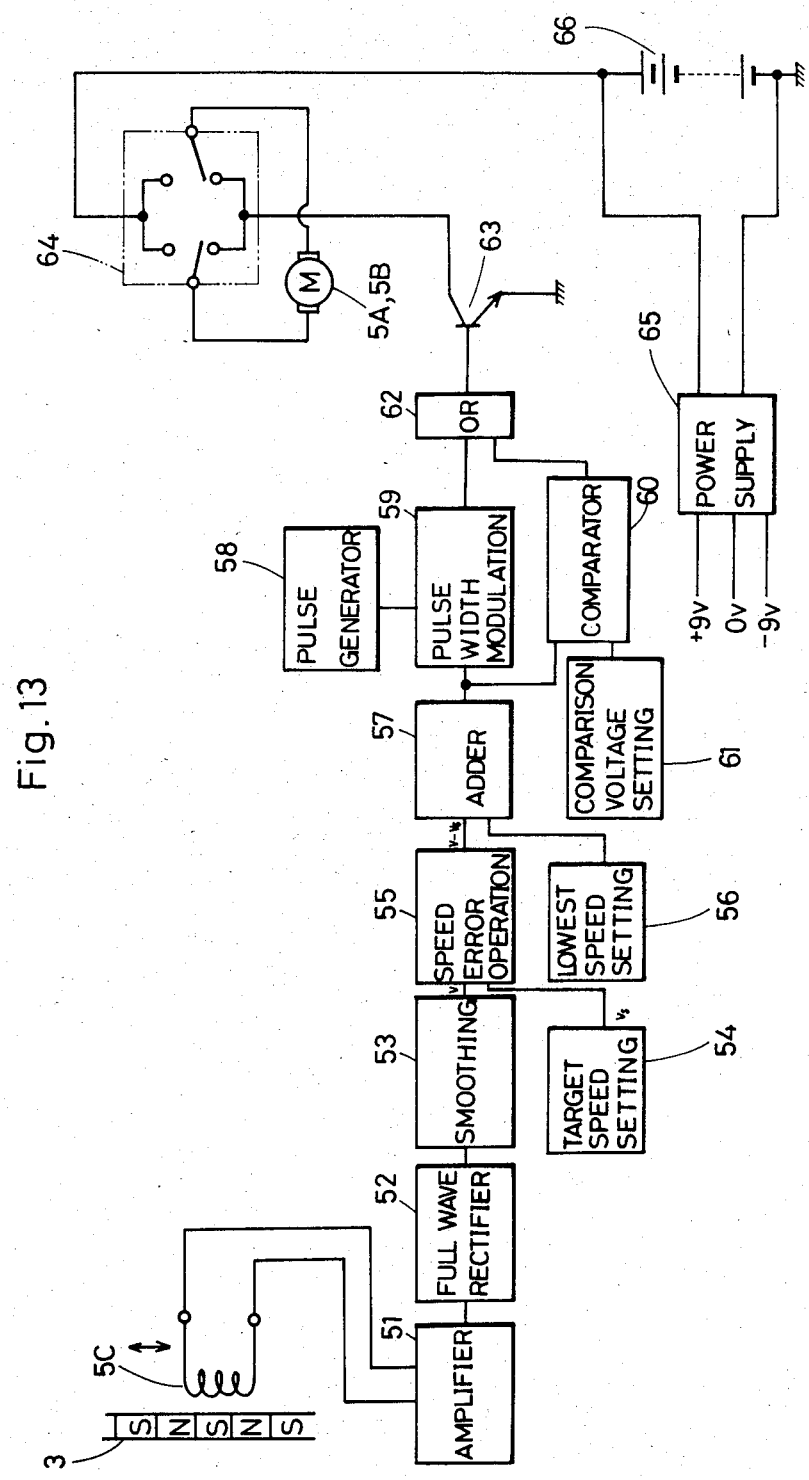
FIG. 13 is a block diagram of a speed control device.

Speed control device of the third embodiment is shown in FIG. 13. The speed detector coil 5C is connected with amplifier circuit 51, and further connected with an input of speed error operation circuit or subtractor 55 through full wave rectifier circuit 52 and smoothing circuit 53.

Target speed setting circuit 54 for generating a set voltage is connected with the other input of the speed error operation circuit 55. Lowest speed setting circuit 56 and the speed error operation circuit 55 are connected with an input of adder circuit 57, and the output of the adder circuit 57 is connected with both of pulse width modulation circuit 59 and comparator circuit 60. Pulse generator circuit 58 is also connected to the pulse width modulation circuit 59, and comparison voltage setting circuit 61 is connected to the other input terminal of the comparator circuit 60. The pulse width modulation circuit 59 and the comparator circuit 60 are connected with an input of OR circuit 62, and output of the OR circuit is connected with the base of transistor 63 to interrupt current of linear motor M. Numeral 64 designates a manipulated switch to change travel direction of the motor M for regular or reverse. Numeral 65 designates a power supply to provide a positive or negative voltage to be needed for the speed control device, and the power supply is connected with a battery 66.

Figure 11:
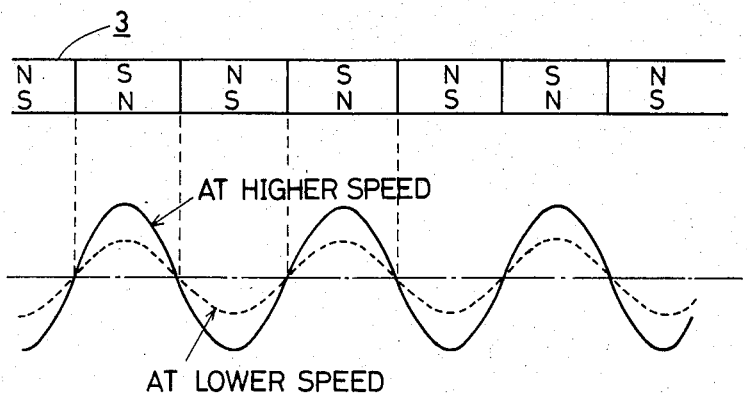
FIG. 11 is a wave form chart showing a speed signal induced in a speed sensing coil, FIG. 12 (a), (b) and (c) are plan views illustrating relative positions of the magnets and the moving coil assembly, and a side view both in perspective.
Figure 12A:
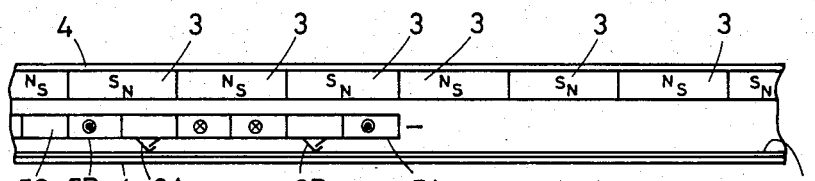
Figure 12B:
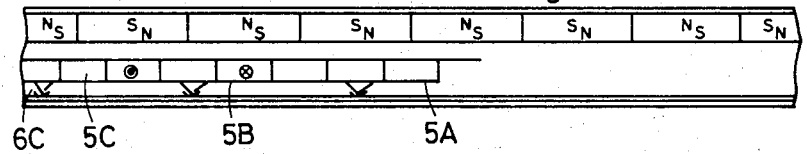
Figure 12C:
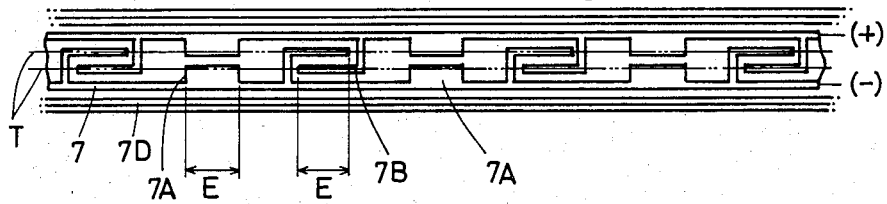

Now the operation of the third embodiment is explained. The principle of operation of the linear motor of this embodiment itself is the same as the first embodiment. When the driver coils 5A, 5B travel forward, the speed detector coil 5C is driven along the row of the permanent magnet 3, and a speed signal having a polarity to disturb the travel is induced in the speed detector coil 5C according to Lenz's law. This speed signal will be an alternating signal as shown in FIG. 11, which has the larger voltage with the higher travel speed of the coil C. And the speed signal is led out of the linear motor through the speed signal sender brush 6C and the speed signal collector pattern 7D.

Figure 14:
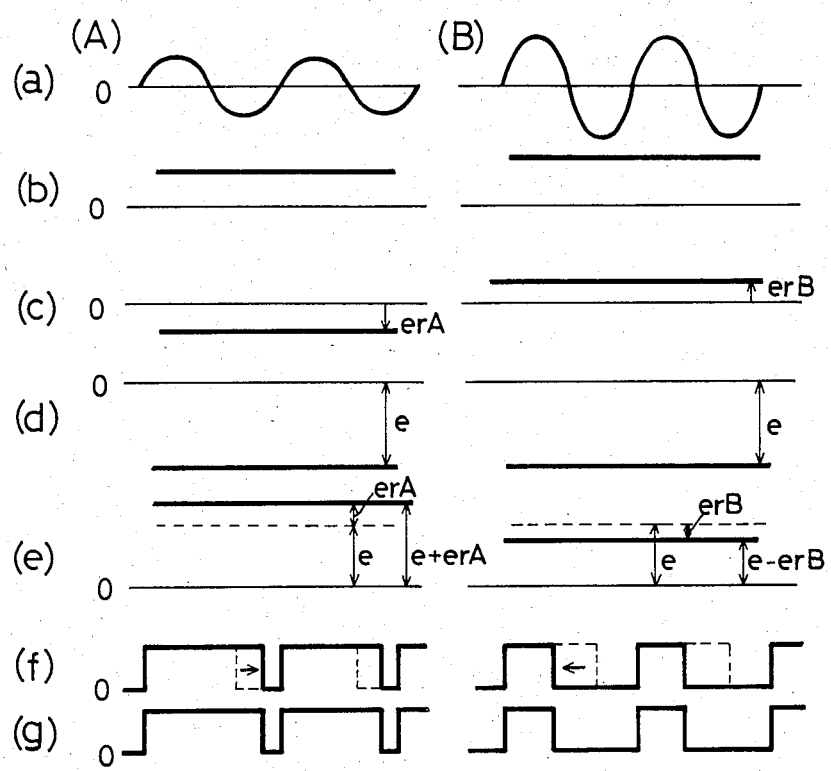
FIG. 14 is a wave form chart showing wave forms of the device, FIG. 15 (a) and (b) are graphical representations of pulses and the operational characteristic of the pulse width modulation circuit.
Figure 15:
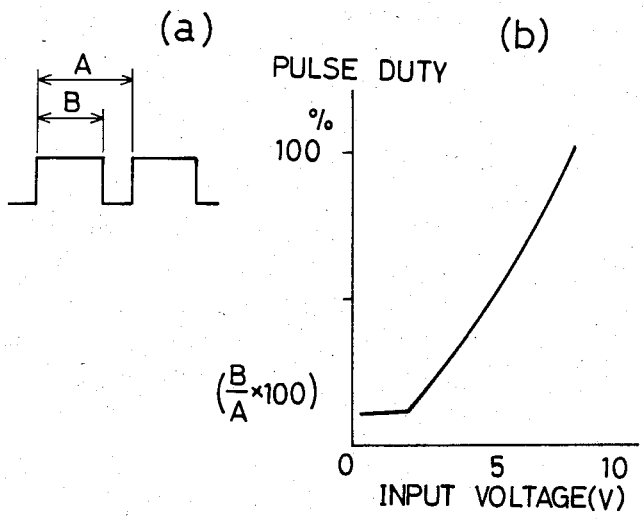

The operation of the speed control device of the third embodiment is further described based on the drawings from FIG. 13 to FIG. 15. The fundamental idea of this third embodiment is to control the current which is provided to driver coils 5A, 5B to get driving force, by pulse width modulation (PWM). Therefore, when the travel speed is lower than the target speed, then the pulse width will be broadened and average current is increased, and driving force is increased. In the opposite case, the pulse width will be narrowed, feed time is shortened and average current is decreased, and driving force is turned down, consequently the travel speed is controlled to the target speed. Referring to FIG. 13, a speed signal induced by speed detecting coil 5C of alternating current as shown in FIG. 14 (a), goes through amplifier circuit 51, full wave rectifier circuit 52 and smoothing circuit 53, and a speed signal of direct current is obtained as shown in FIG. 14 (b). The level of this speed signal is high when the travel speed of the coil 5C is large, and the smaller the travel speed, the lower the speed signal, as respectively shown in FIG. 14 (b) and (a). Next, a difference is gained by the speed error operation circuit 55, between a set voltage of the target speed setting circuit 54 and the output voltage of the smoothing circuit 53. As the result, negative voltage erA is generated by the speed error operation circuit 55 when the target speed is larger than the travel speed of the coil 5C, and positive voltage erB is generated when the target speed is smaller than the travel speed, as shown in FIG. 14 (c). The adder circuit 57 comprising for example an operational amplifier circuit, adds together with polarity the negative voltage as shown in FIG. 14 (d) set by the lowest speed setting circuit 56, and the output of speed error operation circuit 55. The output signal of the adder circuit 57 is shown in FIG. 14 (e), that is, when the target speed is larger than the travel speed of the speed detector coil 5C, the output voltage erA is added together wih the set voltage e set by the lowest speed setting circuit 56, and in the reverse case, the output voltage erB is subtracted from said set voltage e. Said set voltage e is an offset voltage to operate the speed control device of the embodiment, if the output voltage erA or erB is zero.

The pulse generator circuit 58 comprising non-stable multivibrator, generates pulse B of repeated pulse interval A and pulse duty of about 15% as shown in FIG. 15 (a), and provides the pulse B to the pulse width modulation circuit 59.

The pulse width modulation circuit 59 receives the pulse B of the pulse generator circuit 58 as clock pulses, and varies the pulse duty of the pulse B to larger or smaller as shown in FIG. 14 (f), according to the voltage of the output signal of the adder circuit 57, by the square characteristic of itself shown in FIG. 15 (b).

The comparator circuit 60 using an operational amplifier is given voltage corresponding to 90% pulse duty in the characteristic curve of FIG. 15 (b), from the comparison voltage setting circuit 61 to an input terminal thereof. Therefore, when the adder circuit 57 generates a signal voltage being larger than said voltage corresponding to 90% pulse duty and gives this signal voltage to both the pulse width modulation circuit 59 and the other terminal of the comparator circuit 60, then the comparator circuit 60 will generate a high level voltage, and give this voltage to a base of the switching transistor 63 through the OR circuit 62, so the transistor 63 is saturated and collector and emitter of the transistor 63 conduct.

The OR circuit 62 also transfers an output signal of the pulse width modulation circuit 59 to the transistor 63. In result, the driver signal for the transistor 63 will become pulses of large duty as shown in (A) row of FIG. 14 (g) when the target speed is larger than the travel speed of the speed detector coil 5C, and will become pulses of small duty as shown in (B) row of FIG. 14 (g) when the target speed is smaller than the travel speed, so that the current flowing to the driver coils 5A and 5B varies in the same way, and the travel speed of the linear motor M is controlled in a feed back manner to the constant speed desired. And the travel direction of the linear motor M is changed by switching the manual switch 64.

Figure 16:
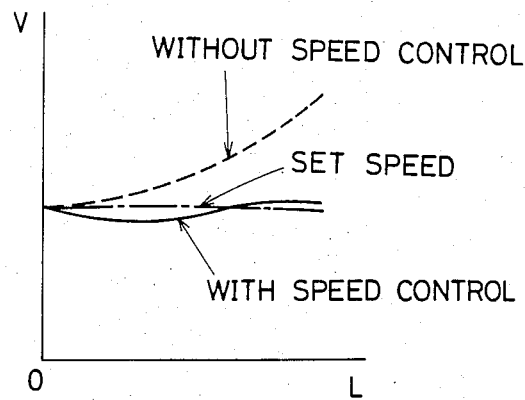
FIG. 16 is a characteristic graph explaining the speed controlling effects of the speed control.
Figure 17:
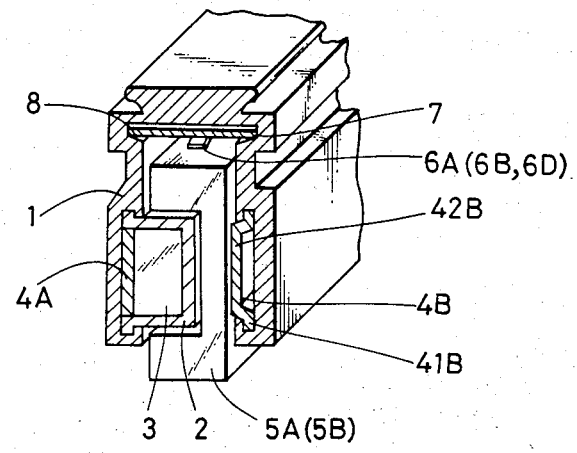
FIG. 17 is a partially broken away view in perspective of the fourth embodiment of the linear motor of this invention.
Figure 18:
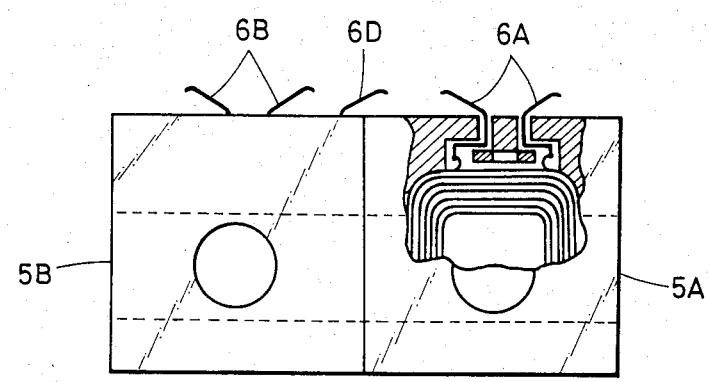
FIG. 18 is an elevational view of the moving coils partially broken away.
Figure 19:
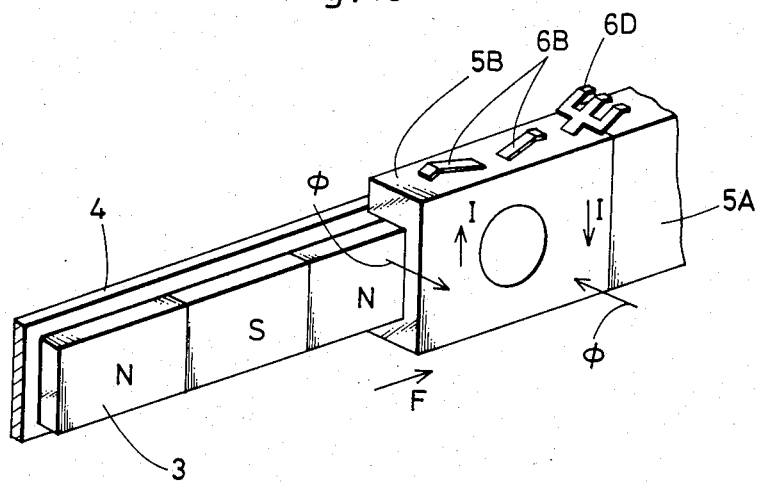
FIG. 19 is a perspective illustration showing relative arrangement between the permanent magnet and the moving coils, FIG. 20 (a), (b) and (c) are section views and a bottom view which respectively indicate the relationship between the current flow in the moving coil and the permanent magnet, and between brushes and patterns in operating condition, FIG. 21 (a), (b) are circuit diagrams showing two kinds of pulse generating means for generating pulse signals including pulse rows having a phase difference of 90 degrees.

The speed control device of the third embodiment provides an advantage that the travel speed V of the linear motor is constantly controlled at a desired set speed despite the large or small travel distance L, as shown in FIG. 16.

(The Fourth Embodiment)

Referring to the drawings from FIG. 17 to FIG. 20, the fourth embodiment of the invention which is provided with a stop position control system is explained. Numeral 1 designates a stator rail of generally reverse U-shaped cross section. Generally flat plate shaped permanent magnets 3 which are magnetized in the direction of their thickness and arranged side by side with alternating polarity of the magnetic pole, are held in an inner surface of one foot of the rail 1, by a magnet holder member 2 of sideways U-shaped cross section. In the stator rail 1, a couple of driver coils 5A, 5B which are folded with the upper and down parts thereof and have a generally sideways U-shaped cross section, are movably guided or supported by permanent magnet 3 through the magnet holder member 2. Each of the couple of coils 5A, 5B is 1.5 times as long as the magnetic pole of the magnet 3, and has a space of 0.5 times the length of the magnetic pole, and an active coil part of the each coil faces the magnet 3. On the respective upper parts of the coils 5A, 5B, collector brushes 6A, 6B which are respectively connected with the coil ends of the coils, are provided, and these brushes 6A, 6B are lineally arranged so the path T of the brushes draws a streak line of a path T as shown in FIG. 20 (c).

Though the above structures are almost the same with the second embodiment, a short brush 6D which is formed as a comb having three teeth is provided between the collector brush 6A and the collector brush 6B on the upper part of the driver coils 5A, 5B in this fourth embodiment. A feeder pattern 7 is disposed on an inner side of the upper part of the rail 1. Positive and negative conductors 7A, 7B of the feeder pattern 7 are alternately arranged with each other so that a line of the brushes 6A, 6B will be alternately contacted with the conductors 7A, 7B, and both of the contacted parts of the positive conductor 7A and the negative conductor 7B are slightly shorter than the magnetic pole of the permanent magnet 3 in the length thereof, and insulator parts 7C of a short length are disposed in connecting parts between the conductors where the magnetic polarities are changed. The interval of the contact parts of collector brushes 6A, 6B which contact with the positive and negative conductors 7A, 7B, are a little larger than 0.5 times the length of the magnetic pole.

Figure 21A:
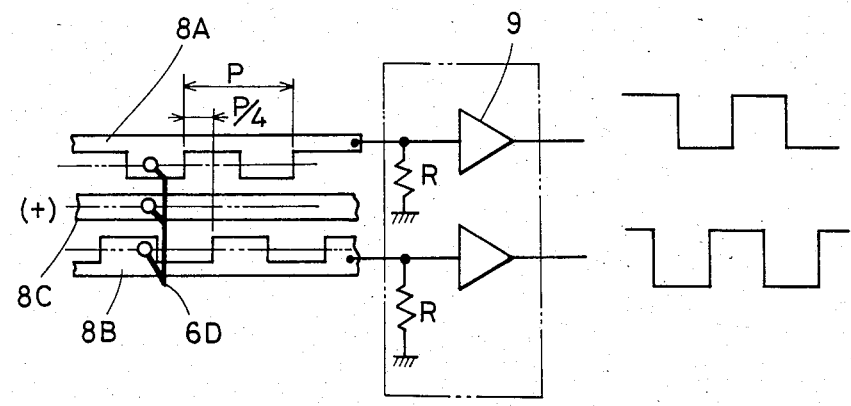
Figure 21B:
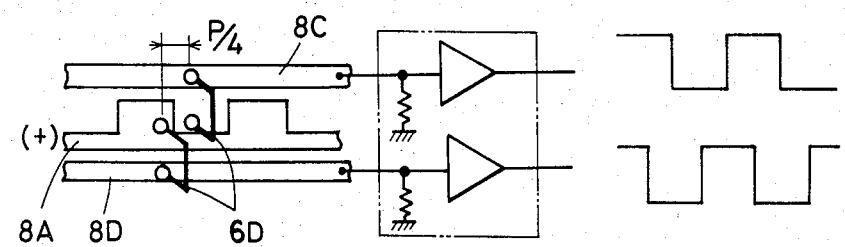

A pulse generator stringing pattern 8 which has two sense patterns 8A, 8B of a comb-shaped and a plate-shaped conductor 8C disposed between these patterns 8A, 8B is provided beside the feeder pattern 7 on the inner top surface of the stator rail 1. As shown in FIG. 21 (a), these sense patterns 8A, 8B are staggered a length of one fourth of a pitch P off from each other, in order to get pulse lines of respective repeated period P and having a phase difference of 90 degrees in electrical angle. Those pulse lines can also be successfully acquired by the arrangement as shown in FIG. 21 (b). In FIG. 21 (b), the pulse generator stringing pattern 8 comprises, one comb-shaped sense pattern 8A, two plate conductors 8C, 8D which are disposed on both sides of the sense pattern 8A, and two short brushes 6D which are alternately arranged a length of one fourth pitch P off from each other. The plate conductor 8C or the sense pattern in the center of the pulse generator stringing pattern 8 is connected with a positive pole (+) of a source. Numeral 9 designates a buffer amplifier.

In addition, a yoke 4A of a flat plate shape is inserted between one foot of the rail 1 and the permanent magnet 3, and a yoke 4B which has a projecting portion 42B in the midway between upper and lower inserting portions 41B, is inserted in the other foot of the rail 1, of which the projecting portion 42B is set up with a little air gap from the coils 5A, 5B.

Figure 22:
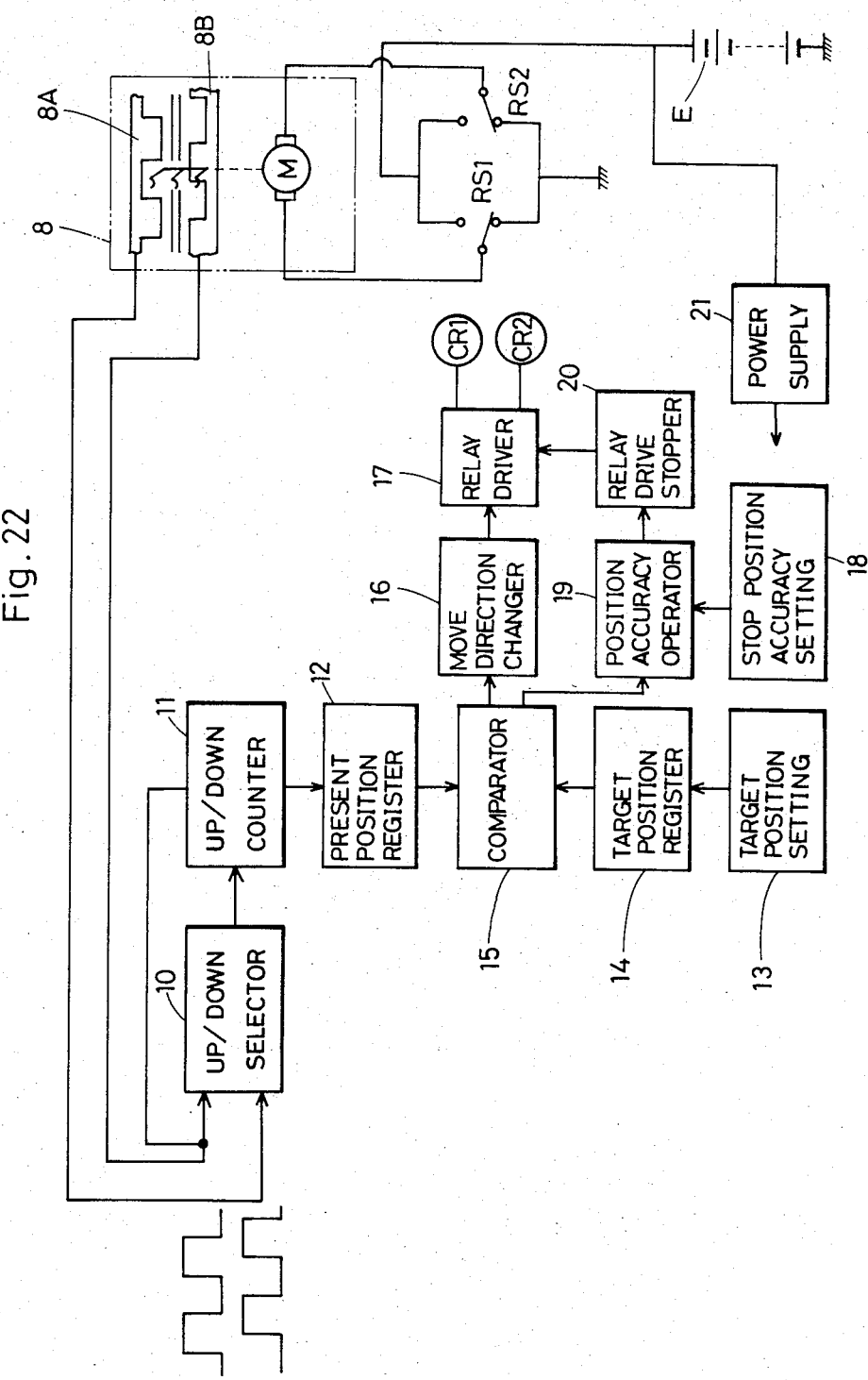
FIG. 22 is a block diagram of a stop position control system employing a moving coil type linear motor of the fourth embodiment of this invention.

Referring to FIG. 22, a stop position control system of the fourth embodiment is described. The sense patterns 8A, 8B of the pulse generator stringing pattern 8 are connected with an up/down selector circuit 10 consisting of a D-type edged trigger flipflop, and the sense pattern 8B of the sense patterns is also connected with an up/down counter circuit 11. The output of the up/down counter circuit 11 is connected through a present position register circuit 12 with one of the input terminals of a comparator circuit 15. A target position setting circuit 13 which consists of memory elements represented by switches or read only memories (ROM), is connected with the other input terminal of the comparator circuit 15 through a target position register circuit 14. One of the outputs of the comparator circuit 15 is connected with a relay driver circuit 17 through a move direction changer circuit 16, and the other output of the comparator circuit 15 is also connected with the relay driver circuit 17 through a position accuracy operator circuit 19 and a relay drive stopper circuit 20. A stop position accuracy setting circuit 18 which will set a numerical limit value of a stopping accuracy of the linear motor M for the target stop position, is connected with the one of the inputs of the position accuracy operator circuit 19. Numeral 21 designates a power supply, which transduces from a voltage of a battery E to voltages to be needed in the several parts 10~20 of the control system. The output of the relay driver circuit 17 is connected with relay coils CR1, CR2 which will drive relay contacts RS1, RS2 to change a supply direction for the linear motor M, or to stop by a dynamic braking.

The operation of the linear motor M of the fourth embodiment itself is the same way as the second embodiment shown in the drawings from FIG. 5 to FIG. 8.

When the driver coils 5A, 5B travel along the permanent magnet 3, the short brush 6D is moved by the coils contacting with the pulse generator stringing pattern 8. As shown in FIG. 21 (a), when the voltage of conductor 8C is switched by the teeth of the comb-shaped sense patterns 8A, 8B through the short brush 6D, and pulse signals which are composed of two pulse rows having a phase difference of 90 degrees, are acquired from these sense patterns to the output of the buffer amplifier 9.

Referring to FIG. 22, when the two pulse rows are given to the up/down selector circuit 10, this selector circuit 10 will operate or judge the travel direction of the linear motor M from the phase angle between both pulse rows, and output a judge signal to the up/down counter circuit 11. The up/down counter circuit 11 goes up the number of pulses if the travel direction is right-wise, and goes down if the travel direction is left-wise for example, and outputs the signals showing the absolute value of the present position of the linear motor M by the counting up and down of the incremental pulse signals which only show information of the travel amount from the present position. The present position registor circuit 12 registers the output signals of the up/down counter 11 for a moment.

The target position setting circuit 13 is a means in which a stop target position of the linear motor M is set by a manual operation and memorized as a digital numerical value, and the stop target position will be there in the limits of the travelable distance of the linear motor M, or in the limits of the digital numerical value which will be counted by the up/down counter circuit 11. The target position register circuit 14 registers the numerical value sent by the target position setting circuit 13 for a moment, and sends the numerical value to the comparator circuit 15.

The comparator circuit 15 compares the present position signal from the present position register circuit 12 with the target position signal from the target position register circuit 14, and outputs the signal to show the distinction of an excess or a shortage to the travel direction changer circuit 16, and outputs the signal to show the amount of an excess or a shortage to the position accuracy operator circuit 19.

When the drive direction changer circuit 16 sends an output signal to the relay driver circuit 17 according to the signal showing the distinction of the excess or the shortage, the relay coil CR1 or CR2 is supplied the output of the relay driver circuit 17, the relay contact RS1 or RS2 is driven, and the linear motor M travels in the direction of the target position.

The stop position accuracy setting circuit 18 is a means by which a stoppage accuracy for the target position is set as a numerical value.

The position accuracy operator circuit 19 compares the amount of an excess or a shortage output by the comparator circuit 15 with the numerical value set by the stop position accuracy setting circuit 18, and will send a stop signal to the relay drive stopper circuit 20 when the amount of the excess or shortage is less than the numerical value set as the stoppage accuracy.

When the relay drive stopper circuit 20 receives the stop signal of the position accuracy operator circuit 19, the stopper circuit 20 will stop the drive action of the relay driver circuit 17, and the linear motor M is stopped close to the target position.

(The Fifth Embodiment)

Referring to the drawings from FIG. 23 to FIG. 29, the fifth embodiment of the present invention to control the linear motor at a desired constant speed, is explained.

Figure 23:
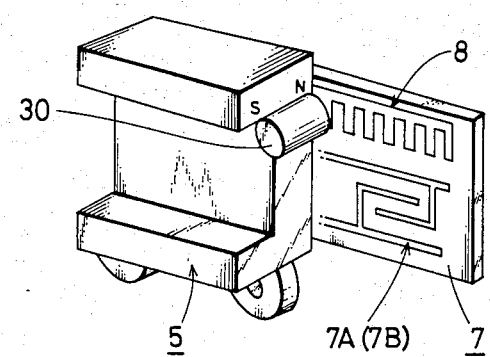
FIG. 23 is a perspective view illustrating the main part of the fifth embodiment of the invention.
Figure 24:
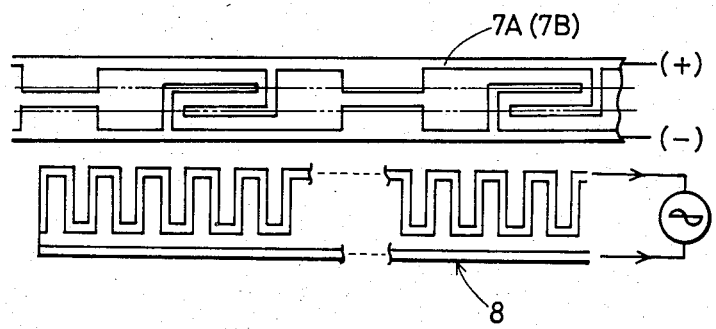
FIG. 24 is a front view indicating the patterns of the stringing.
Figure 25:
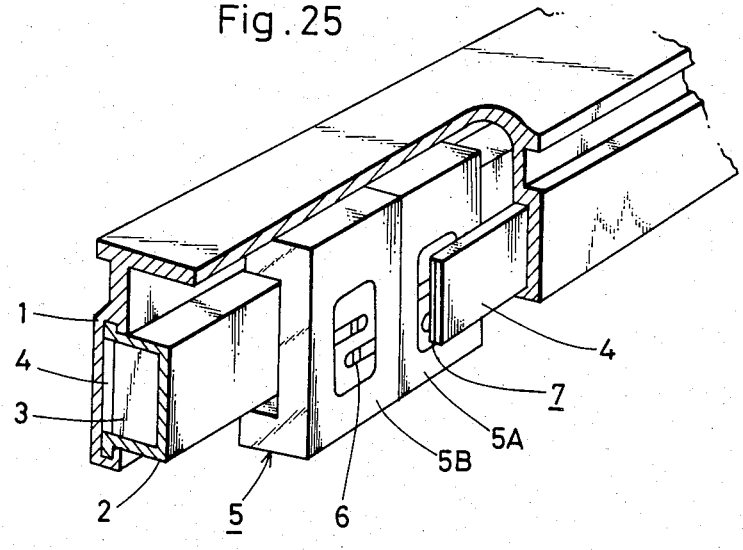
FIG. 25 is a perspective view indicating the structure of the linear motor, FIG. 26 (a) and (b) are perspective views indicating the generating principles of the speed signals and the principles of the linear motor.

As shown from FIG. 23 to FIG. 25, a sensor part of this fifth embodiment comprises, a moving coil assembly 5 of the moving coil type linear motor, feed brushes 6 provided with moving coils 5A, 5B of the assembly 5, feed patterns 7A, 7B of a stringing 7 for energizing the moving coils 5A, 5B through the feed brushes 6, and a sense pattern which is shaped as a continuous rectangle-line and parallelly provided with the feed patterns 7A, 7B of the stringing 7. The sense pattern 8 is formable by etching or transcription process of a flexible printed circuit board or a glass-epoxy resin printed circuit board in the same way as the feed patterns 7A, 7B. The sensor part of the fifth embodiment further comprises a small moving-magnet 30 which is embedded in the moving coil assembly 5 by resin molding.

The motor driving mechanism of the fifth embodiment is the same as the first embodiment, so the mechanism will be simply explained herein. The linear motor of the fifth embodiment comprises, a stator rail 1 of a generally U-shaped cross section, a magnet holder member 2 which guidably supports the moving coil assembly 5 in the rail 1, field magnets 3 of flat plate-shape and magnetized in the direction of thickness which are held within the magnet holder member 2 and alternately arranged with a varying magnetic polarity side by side, and yokes 4 of which the one yoke 4 is disposed between the back surface of the field magnet 3 and the inner surface of one foot of the stator rail 1 of a generally U-shape, the other yoke 4 is disposed between the inner surface of the other foot of the stator rail 1 and the stringing 7. And in operation, when the feed patterns 7A, 7B are supplied direct voltage as shown by FIG. 24, the moving coils 5A, 5B are alternately or simultaneously fed, and the moving coils 5A, 5B are driven by the force in accordance with Fleming's left-hand rule for the direction of right angle with the flux of the field magnet 3, as shown in FIG. 26 (b), the moving coil assembly 5 travels along the magnet holder member 2 of the stator rail 1.

By the travelling of the moving coil assembly 5, the sense pattern 8 of the stator rail moves relatively to the flux of the permanent magnet 30 which travels with the moving coil assembly 5, so an electromotive force e in accordance with Fleming's right hand rule is induced at the conductor as the active coil part of the sense pattern 8, as shown in the FIG. 26 (a). When the travel direction of the moving coil assembly 5 is reversed, the electromotive force e will be reversely induced in the sense pattern 8, and if the magnetic pole NS is changed, the electromotive force e is reversely induced in the same way.

Referring to the FIG. 27, the relation between the direction of the travel of the permanent magnet 30 embedded in the moving coil assembly 5, and the output current which will flow through a resistance R connected with output terminals X, Y will be explained, for the case when the permanent magnet 30 travels to the left as indicated by an arrow M. When the permanent magnet 30 travels across the conductor wire A, A as the active coil part of the sense pattern 8 to the left of the FIG. 27, current i will flow downward through the conductor wire A, A by the electromotive force in accordance with Fleming's right hand rule, a positive voltage $+e(V)$ is generated at the terminal X of the output terminals X, Y as the current is observed from the base terminal Y(OV). When the permanent magnet 30 travels across the conductor wire B, B of the active coil part of the sense pattern 8, current i will flow also downward through this conductor wire B, B, and a negative voltage $-e(V)$ is generated at the terminal X. Consequently, an alternating pulse voltage which has higher crest value and frequency in accordance with the increase of travel speed of the permanent magnet 30 will be detected, between the output terminals X, Y as shown in the FIG. 28.

Figure 29:
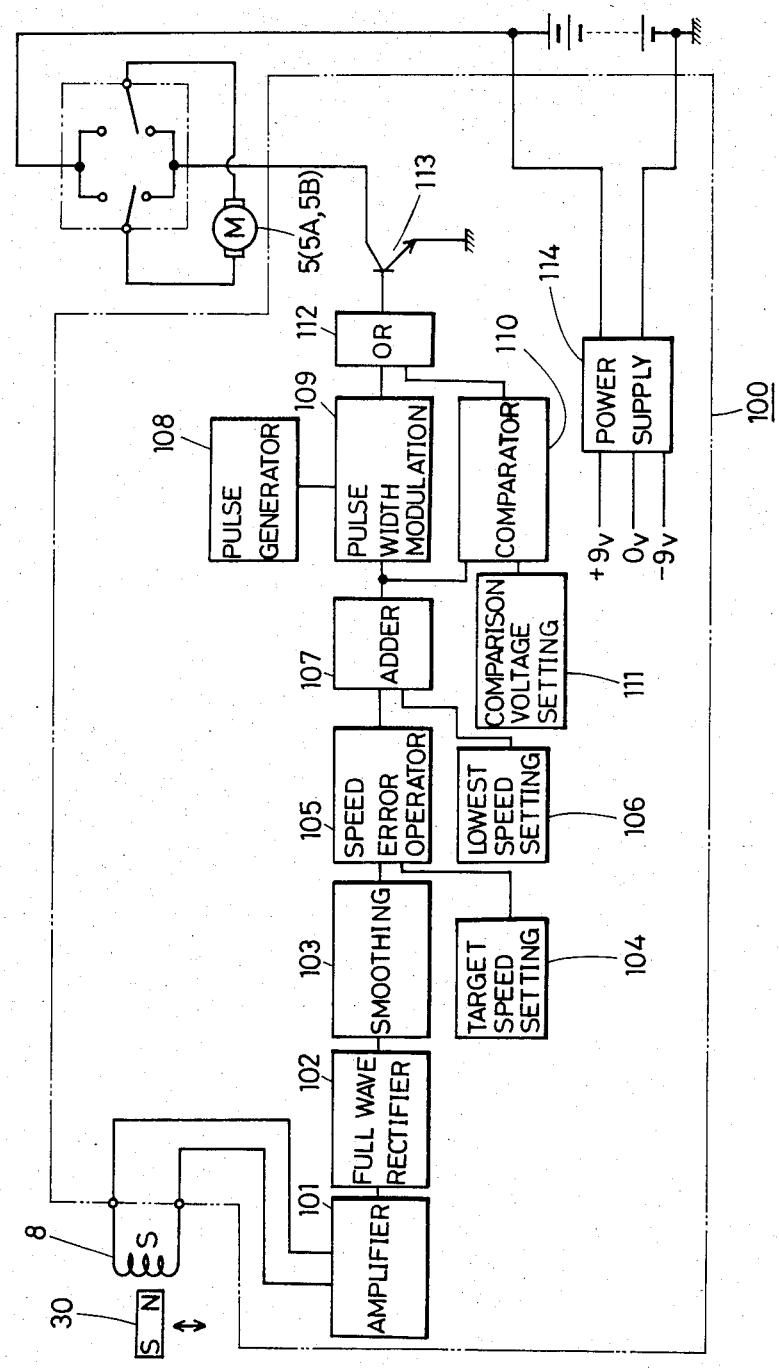
FIG. 29 is a circuit diagram of the speed control circuit.

The speed control of the moving coil assembly 5 becomes possible by a feedback of this alternating pulse voltage as a speed signal S to the speed control circuit 100 shown in the FIG. 29.

The speed control circuit 100 of the FIG. 29 controls the pulse width of pulse current which is supplied to the moving coils 5A, 5B by the pulse width modulation (PWH) method, according to the crest value of the speed signal S. The speed signal S generated in the sense pattern 8 is amplified by an amplifier circuit 101, rectified and smoothed respectively by a full wave rectifier circuit 102 and a smoothing circuit 103, and becomes a DC voltage V. Then, speed error voltage V-Vs is obtained by a speed error operation circuit 105 which subtracts set voltage Vs of a target speed setting circuit 104 from the DC voltage V. An adder circuit 107 adds the speed error voltage V-Vs and a set voltage of a lowest speed setting circuit 106, and a pulse width modulation circuit 109 modulates the pulse width of pulses generated from a pulse generator circuit 108 by the sum voltage of the adder circuit 107. The manner of the pulse width modulation is to enlarge the pulse width when the travel speed of the moving coil assembly 5 is slower than the target speed, and to narrow the pulse width in the reverse case. The output voltage of the adder circuit 107 is given also to a comparator circuit 110. The comparator circuit 110 the output voltage of the adder circuit 107 with a comparison voltage of comparison voltage setting circuit 111 which generates comparison voltage in accordance with 90% of the maximum speed of the linear motor, and the comparator circuit 110 generates output current of high level when the output voltage of the adder circuit 107 is higher than the voltage in accordance with 90% of the maximum speed. An OR circuit 112 transmits the pulse current from the pulse width modulation circuit 109, or the high level current from the comparator circuit 110 to a base of a transistor 113, then the transistor 113 is made ON or OFF by its base current, and the travel speed of the moving coil assembly 5 is feed-back controlled at the target speed. A power supply circuit 114 supplies positive or negative power needed at the circuit elements 101~112 of the speed control circuit 100.

The fifth embodiment above described, provides an advantage that the speed signal can be obtained without any sensor brush or contact part.

(The Sixth Embodiment)

Referring to FIGS. 30-34, the sixth embodiment is explained.

Figures 30, 30C:
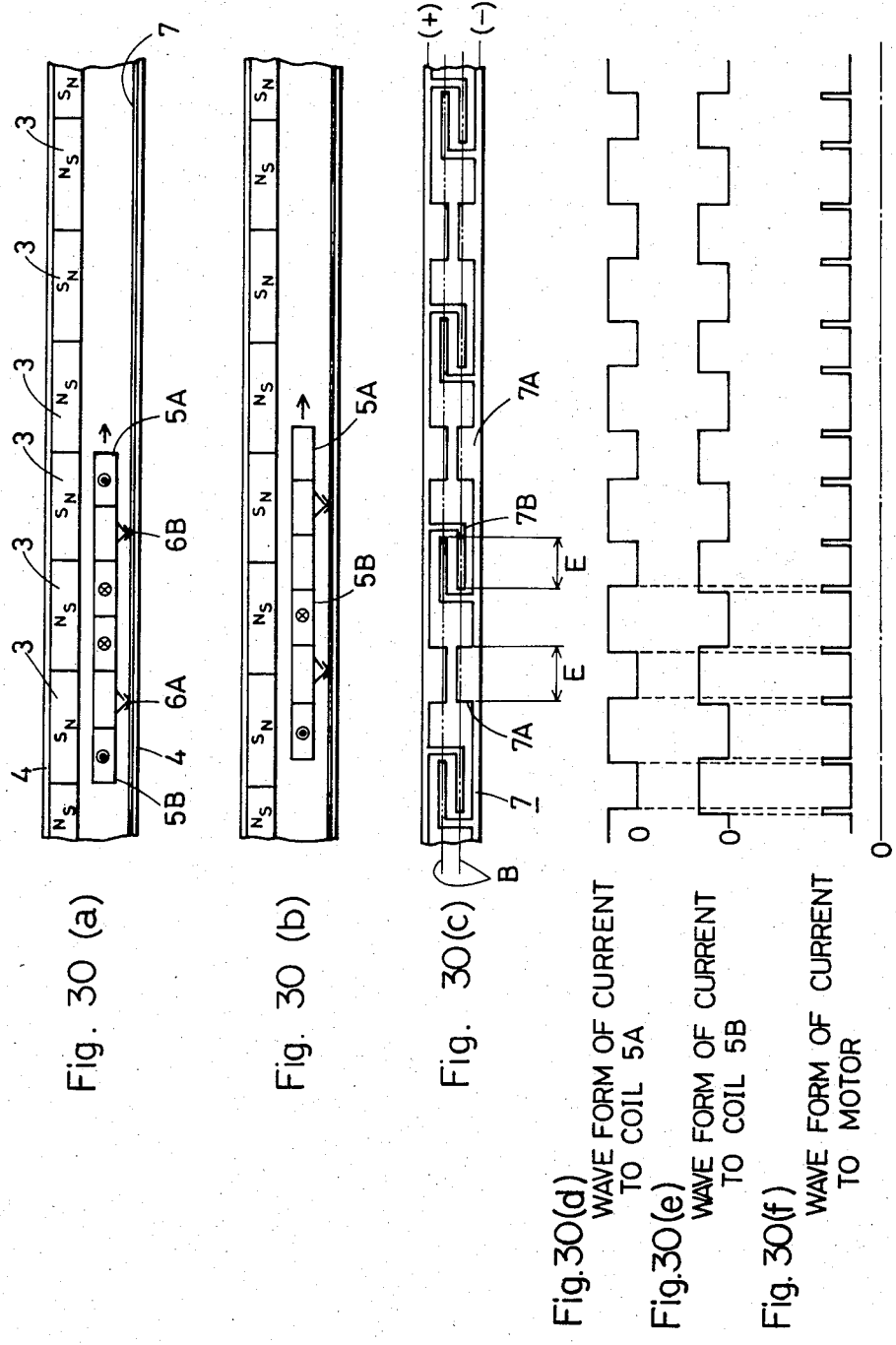
FIG. 30 (a)~(f) are views illustrating both relative position relations among the magnets in the motor, the stringings, and the moving coil, and a state of a fluctuation of the motor current as the moving coil moves at the sixth embodiment of this invention.

The sixth embodiment is available to the linear motor of the first embodiment shown in FIGS. 1–4. FIGS. 30 (a), (b) and (c) of the sixth embodiment illustrates the equal structure as FIGS. 4 (a), (b) and (c) of the first embodiment.

Because both armature coils 5A, 5B are simultaneously fed by the feed patterns 7A, 7B of the stringing 7 through the brushes 6A, 6B every constant distance of their travel as shown in FIGS. 30 (a), (b), (c), the currents to the coils 5A, 5B are respectively varied as time passes as shown in FIGS. 30 (d), (e), and the current to the linear motor which is the sum of the both currents to the coils 5A, 5B will contain pulses at the time of every simultaneous feed, as shown in FIG. 30 (f).

Figure 31:
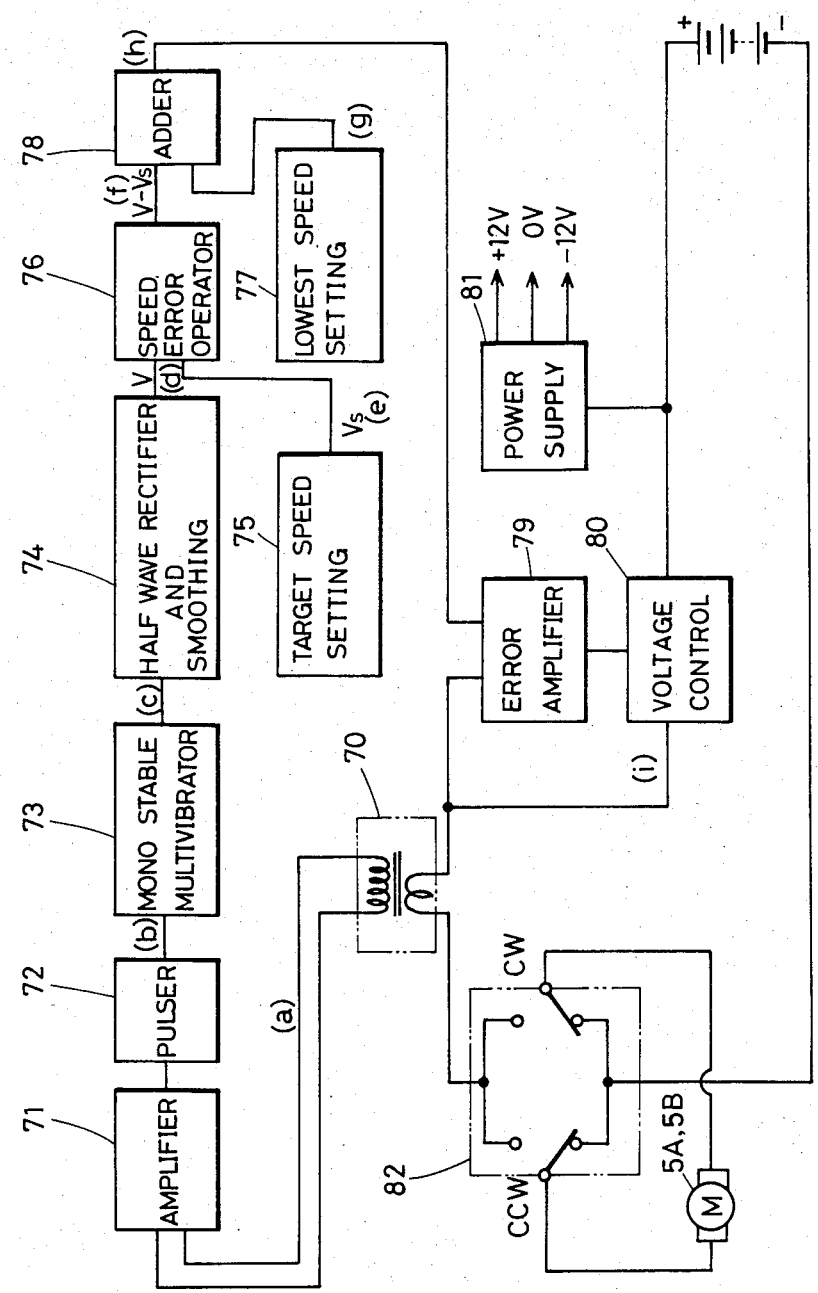
FIG. 31 is a block diagram of a speed control system.

The speed control system of the sixth embodiment shown in FIG. 31 comprises, a current pulse detector transformer 70 which is provided in series circuit with the supply circuit of the armature coils 5A, 5B of the linear motor, an amplifier circuit 71, a pulser circuit 72, a mono stable multivibrator circuit 73, a half wave rectifier and smoothing circuit 74, a target speed setting circuit 75, a speed error operator circuit 76, the lowest speed setting circuit 77, an adder circuit 78, an error amplifier circuit 79, and a voltage control circuit 80. The speed control system also comprises, a power supply circuit 81 which generates positive and negative voltages to be needed at the above circuit elements 71~80, and a manual switch 82 to change the polarity of feeding to the armature coils 5A, 5B.

The operation of the sixth embodiment of the above structure will be explained together with FIGS. 32–34.

The drive principle of the linear motor is based on Fleming's left hand rule, that is, when the armature coils are fed by the stringing 7 through the brushes 6A, 6B as shown in FIG. 30, a propulsion force is yielded for the right angle direction of both currents to the armature coils 5A, 5B and the flux of the magnet 3, and the coils 5A, 5B are driven by the force, so that the coils 5A, 5B will gain a continuous drive force by an alternative feeding according to the magnetic polarity of the magnets 3 which are arranged alternatively side by side.

The fundamental idea for speed control of the speed control system shown in FIG. 31, is to control the current which is fed to the armature coils by the height of voltage. Therefore, the supply voltage is increased when the travel speed of the armature coils are lower than the target speed to increase feed current and the propulsion force, and the supply voltage is decreased when the travel speed of the armature coils is higher than the target speed, to decrease feed current and the propulsion force, so that the travel speed will approach the target speed.

Figure 32:
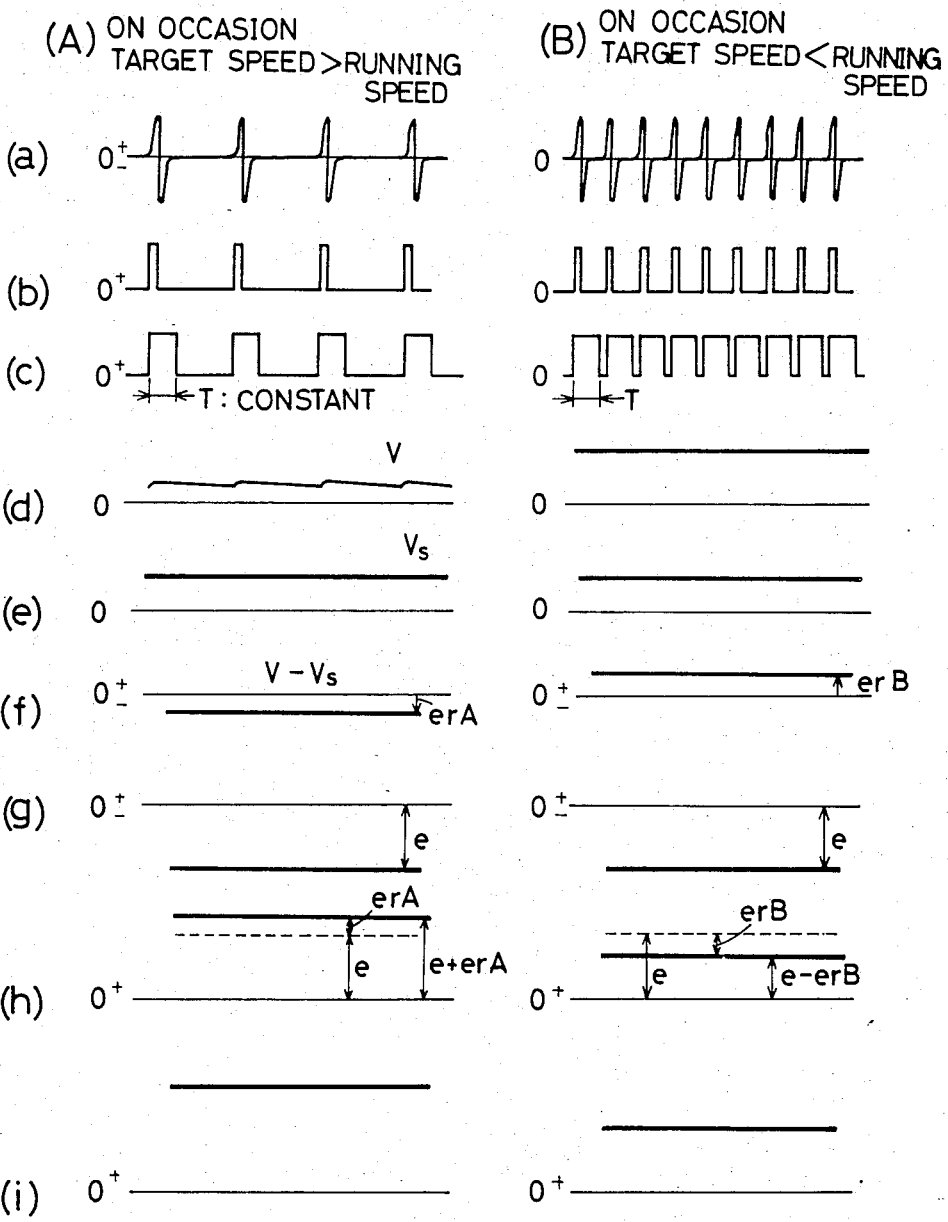
FIG. 32 is a wave form chart showing the wave form of every part of the speed control system in operation accompanied with big and small relations between the target speed and actual running speed.
Figure 33:
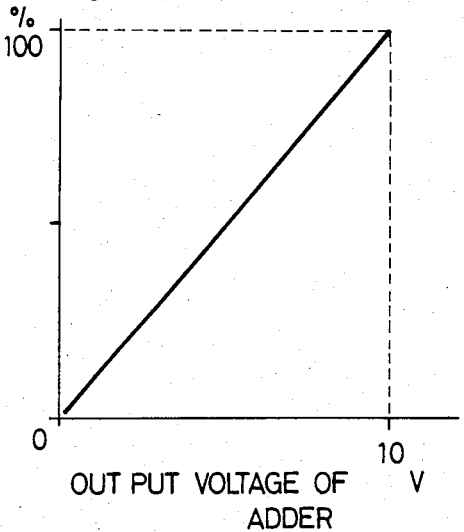
FIG. 33 is a characteristic chart showing the output voltage characteristics of the voltage control circuit corresponding to the output voltage of the adding circuit.

In the speed control system of FIG. 31, the signal of alternating pulse form which is induced in the current pulse transformer 70 as shown in FIG. 32 (a), is shaped to the output signal of DC pulse form by the amplifier circuit 71 and the pulser circuit 72 as shown in FIG. 32(b), and the DC pulse is inputted to the mono-stable multivibrator circuit 73. The mono-stable multivibrator circuit 73 generates a pulse having a constant time-period T according to each pulse signal inputted, as shown in FIG. (c). Therefore, when the running speed of the coils 5A, 5B is smaller than the target speed, the pulse intervals are coarse as shown in the column (A) of FIG. 32 (c), and when the running speed of the coils 5A, 5B is larger than the target speed, the pulse intervals are fine as shown in the column (B) of FIG. 32 (c). This signal becomes a voltage signal of DC level by the operation of the half wave rectifier and smoothing circuit 74 as shown in FIG. 32 (d), and the DC voltage value of the voltage signal corresponds with the running speed. The speed error operator circuit 76 generates difference voltages between optional set voltage Vs of the target speed setting circuit 75 as shown in FIG. 32 (e), and output voltage V of the half wave rectifier and smoothing circuit 74. As the result, negative voltage erA is output when the target speed is larger than the running speed, and positive voltage erB is output when the target speed is smaller than the running speed, as shown in FIG. 32 (f). The adder circuit 78 which comprises operational amplifiers and other elements, adds the optional negative voltage set by the lowest speed setting circuit 77 as shown in FIG. 32 (g), and the output voltage of the speed error operator circuit 76, taking polarity into account. The operation result is as shown in FIG. 32 (h), when the target speed is larger than the running speed, the output voltage value of the adder circuit 78 will be the sum of the set voltage e of the lowest speed setting circuit 77 and the output voltage erA of the speed error operator 76, and when the case is contrary, will be the difference which is subtracted from the output voltage erB from the set voltage e. The set voltage e of the lowest speed setting circuit 77 is the off-set voltage which is intended for the linear motor to be movable, if the both output voltages erA and erB of the speed error operator circuit 76 are zero(=0).

The error amplifier circuit 79 operates on the difference error between the output signal voltage of the adder circuit 78 as shown in FIG. 32 (h), and the output voltage of the voltage control circuit 80, amplifies the error, and sends an input to the voltage control circuit 80. The DC output voltage of this voltage-control circuit 80 which comprises cascaded power-transistors, is as shown in FIG. 32 (i). The output voltage characteristics of the voltage control 80 to the output voltage of the adder circuit 78, is a proportional characteristics as shown in FIG. 33.

Figure 34:
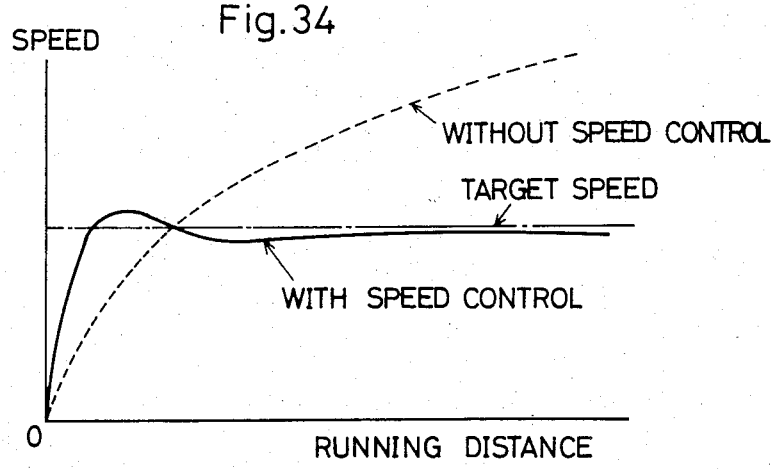
FIG. 34 is a characteristic chart showing the effect.

The effect of the sixth embodiment is that the running speed of the linear motor is constantly controlled as shown in FIG. 34. In addition, the speed control system of the sixth embodiment can be adaptable not only to the linear motor of the first embodiment, but also to the linear motor of the second embodiment of the invention which is provided with the collector brushes on the upper parts of the armature coils, and moreover the sixth embodiment can be adaptable to every type of moving-coil type linear motor. Though the current pulse transformer 70 is used as the current pulse detector means in the sixth embodiment, an impedance such as a resistance which connected with the linear motor in series is also available as the current pulse detector means. According to the sixth embodiment of the invention, an advantage is provided in that the speed signal can be detectable from the current pulse of the linear motor without any physical modification of the linear motor mechanism.

Although the invention has been described in its preferred form with a certain degree of particularity, it is understood that the present disclosure of the preferred form has been changed in the details of construction and the combination and arrangement of parts may be resorted to without departing from the spirit and the scope of the invention as hereinafter claimed.

What is claimed is:

1. A moving coil type linear motor comprising a stator rail of generally U-shaped cross-section having a speed signal collector pattern, a permanent magnet having the shape of a flat plate and being magnetized in the direction of its thickness, said permanent magnet being provided on an inner side of the rail to provide alternating magnetic poles next to each other, a pair of driver coils arranged in series in the longitudinal direction of the rail with each coil having a length 1.5 times that of the magnetic pole and a space of 0.5 times the length of the magnetic pole in the center thereof, said coils being disposed opposite the permanent magnet and movable along the permanent magnet within the rail, collector brushes provided with the respective coils, a feeder pattern arranged on an inner side of the rail, said feeder pattern being configured with correspondence to the position of the magnetic poles so that electric power is fed to the coils through brushes only when respective active parts of the coils are fully disposed in magnetic flux of the same direction, a speed sensing means for sensing a rate of movement of said driver coils and for providing a speed signal, said speed sensing means being a speed detector coil separate from said drive coils and having speed signal sender brushes contacting and being movable along said collector pattern of said stator rail, and a speed control means for controlling the rate of movement of said driver coils in accordance with said speed signal of the speed sensing means which is fed through said sender brushes and said collector pattern to the speed control means.

2. A moving coil type linear motor comprising a stator rail of generally U-shaped cross-section having a pulse generator stringing pattern containing at least one comb shaped sense pattern, a permanent magnet having the shape of a flat plate and being magnetized in the direction of its thickness, said permanent magnet being provided on an inner side of the rail to provide alternating magnetic poles next to each other, a pair of driver coils arranged in series in the longitudinal direction of the rail with each coil having a length 1.5 times that of the magnetic pole and a space of 0.5 times the length of the magnetic pole in the center thereof, said coils being disposed opposite the permanent magnet and movable along the permanent magnet within the rail, collector brushes provided with the respective coils, a feeder pattern arranged on an inner side of the rail, said feeder pattern being configured with correspondence to the position of the magnetic poles so that electric power is fed to the coils through brushes only when respective active parts of the coils are fully disposed in magnetic flux of the same direction, a speed sensing means for sensing a rate of movement of said driver coils and for providing a speed signal, said speed sensing means being a short brush provided with said drive coils and the speed signal being derived from said short brush responsive to movement of the driver coils and a speed control means for controlling the rate of movement of said driver coils in accordance with said speed signal of the speed sensing means.

3. A moving coil type linear motor as claimed in claim 2, further characterized in that the speed signal provided by the short brush is introduced to a stop position control system comprising an up/down counter which counts pulse signals, target position setting means, and move direction changer means to changeably control the travel direction of the driver coils on the basis of the difference between the number of pulses counted by said up/down counter and a target position set by said target position setting means.

4. A moving coil type linear motor as claimed in claim 2, further characterized in that said short brush is provided on an upper part of the driver coils along with the collector brushes, and said stringing pattern is provided side by side with the feeder pattern on the inner surface of the upper part of the stator rail.

5. A moving coil type linear motor comprising a stator rail of generally U-shaped cross-section, a permanent magnet having the shape of a flat plate and being magnetized in the direction of its thickness, said permanent magnet being provided on an inner side of the rail to provide alternating magnetic poles next to each other, a pair of driver coils arranged in series in the longitudinal direction of the rail with each coil having a length 1.5 times that of the magnetic pole and a space of 0.5 times the length of the magnetic pole in the center thereof, said coils being disposed opposite the permanent magnet and movable along the permanent magnet within the rail, collector brushes provided with the respective coils, a feeder pattern arranged on an inner side of the rail, said feeder pattern being configured with correspondence to the position of the magnetic poles so that electric power is fed to the coils through brushes only when respective active parts of the coils are fully disposed in magnetic flux of the same direction, a speed sensing means for sensing a rate of movement of said driver coils and for providing a speed signal, said speed sensing means being a continuous rectangular-line provided on said stator rail for detecting speed and having an active coil part making a right angle with the travel direction of said driver coils, and a movable permanent magnet mounted with said driver coils to supply magnetic flux to said continuous rectangular line, and a speed control means for controlling the rate of movement of said driver coils in accordance with said speed signal of the speed sensing means.

6. A moving coil type linear motor as claimed in claim 5, further characterized in that said continuous rectangular-line for detecting speed is disposed in parallel with the feeder pattern.

7. A moving coil type linear motor comprising:
a rail of generally U-shaped cross section having two side feet and a connecting part;
two yokes respectively provided on the inner side of the feet of said rail;
a plurality of permament magnet plates magnetized in the direction of their thickness and so arranged in the lengthwise direction that the direction of magnetization alternates from one plate to another, said plates being provided on only one side yoke on one foot of said rail;
a pair of wound coils disposed in series with each other, said coils having a U-shaped cross section, the upper and lower folded parts of which engaging and being slidably guided by said magnet plates for movement in a direction perpendicular to the magnetic flux from said plates;
a pair of brushes which are fixedly provided with each said coil and connected with coil ends of each of said coils; and
a feeder pattern having a negative conductor and a positive conductor, and so arranged on an inner side of said rail that the feeder pattern is slidably contacted by said brushes to select energization of said coils and to determine the direction of electric current to said coils corresponding to the direction of magnetic flux from said permanent magnet plates.

8. A moving coil type linear motor as claimed in claim 7 characterizing in that:
said pair of brushes are fixedly provided in a space in the center of their corresponding coil and project from one side of said coil; and
said feeder pattern is arranged on the other foot of said rail and slidably contacts said brushes.

9. A moving coil type linear motor as claimed in claim 7 characterizing in that:
said pair of brushes are fixedly provided on an upper portion of said coils, and
said feeder pattern is arranged at the upper inner side of said rail and slidably contacts said brushes.

10. A moving coil type linear motor as claimed in claim 7 characterizing in that:
grooves are formed in both feet of said rail, one of said yokes being disposed in the grooves in one of said feet and a magnet holding member is disposed in the grooves of the other foot so that said magnets and the other yoke are held in place by the holding member on one side of the foot of said rail.

11. A moving coil type linear motor as claimed in claim 7, further comprising:
sensing means for detecting signals regarding the moving speed of said coils, wherein the signals are output without lead wires, and controlling means for controlling the moving speed of said moving coils on the basis of the signals from said sensing means.

* * * * *